COMPACTLY STACKABLE CHAIR

Original Filed March 7, 1960 8 Sheets-Sheet 1

DAVID L. ROWLAND
INVENTOR.
BY

COMPACTLY STACKABLE CHAIR

Original Filed March 7, 1960 8 Sheets-Sheet 2

DAVID L. ROWLAND
INVENTOR.
BY

DAVID L. ROWLAND
*INVENTOR.*

BY

COMPACTLY STACKABLE CHAIR

Original Filed March 7, 1960 8 Sheets-Sheet 4

DAVID L. ROWLAND

INVENTOR.

BY

COMPACTLY STACKABLE CHAIR

Original Filed March 7, 1960 8 Sheets-Sheet 5

DAVID L. ROWLAND
INVENTOR.
BY

DAVID L. ROWLAND
INVENTOR.

BY

COMPACTLY STACKABLE CHAIR

Original Filed March 7, 1960 8 Sheets-Sheet 7

DAVID L. ROWLAND
*INVENTOR.*

BY

DAVID L. ROWLAND
INVENTOR.
BY

United States Patent Office

Re. 26,071
Reissued Aug. 2, 1966

26,071
COMPACTLY STACKABLE CHAIR

David L. Rowland, 49 W. 55th St., New York, N.Y.

Original No. 3,080,194, dated Mar. 5, 1963, Ser. No. 13,090, Mar. 7, 1960. Application for reissue Jan. 11, 1965, Ser. No. 438,809
16 Claims. (Cl. 297—239)

Matter enclosed in heavy brackets [ ] appears in the original patent but forms no part of this reissue specification; matter printed in italics indicates the additions made by reissue.

This invention relates to a compactly stackable chair. More particularly, the invention relates to a non-folding, sturdy, and lightweight chair, groups of which are easily and compactly stackable upon one another; also the chairs of this invention are adapted to be joined together in rows, and the rows likewise are stackable upon one another in a compact manner.

The use of large numbers of removable chairs for audience seating at a great variety of public gatherings has presented problems which heretofore have not been solved satisfactorily. One problem is how to provide a chair that can be stored in a minimum amount of space and is also quickly and simply set in position for use. Since they store fairly compactly, numerous types of folding chairs have been used, with varying degrees of success. But the folding chair has two inherent drawbacks; one, the excessive time it takes to unfold it and later to refold it; and two, the movable joints, which wear, become loose, and ultimately break or deform, bind, and become inoperable. One object of my invention is to provide a non-folding chair having the folding chair's desirable features and yet not possessing the drawbacks of time-consuming operation and movable joints.

Another problem arose in providing removable seating of sufficient strength and durability. Since the chair must be capable of accommodating a wide range of weights and sizes with a large margin of safety, it became conventional to construct the chair of relatively heavy and cumbersome material. But ease in handling is important in its effect on the effort and time of setting up and taking down the chairs. Therefore, another object of my invention is to provide a strong, exceptionally durable chair which is also remarkably easy to handle.

Non-folding chairs have also been used for seating large audiences, and some chairs of this type have been designed to stack or nest upon one another, to some extent. A severe problem encountered with non-folding chairs of the stacking or nesting type was that they required an excessively large space for storage; usually the frame was too large and otherwise was designed so that, although the chairs were "stackable," only a few could be stacked successfully in one pile without falling over. Often there was a three or four inch vertical interval between chairs so that a stack of less than ten chairs was more than four feet high. Another and very important object of my invention is to provide chairs which can be easily and safely placed into an extremely compact and stable stack.

Another problem with the use of large numbers of extra chairs is how to fasten them one to another in a long row so that many chairs may be manipulated simultaneously. Heretofore, the means for fastening chairs together has been cumbersome and heavy. In some instances, a row of chairs was made by permanently attaching them to long boards. This attaching operation required much labor and the use of screws and screw drivers or nuts, bolts, and wrenches. Other means, involving elaborate connecting devices, have encountered problems either through difficulty in operation or weakness in structure. Consequently, a further object of my invention is the provision of a chair having a simple, lightweight, and strong coupling device so that a number of these chairs may be securely fastened together into a row without the necessity of extra parts and tools.

Discomfort is another problem that has long confronted the designers of removable, storable chairs. Because they were designed primarily to fold or to achieve compactness in storage, chairs of this type have been quite uncomfortable, especially when used continuously for even moderate periods of time. It is an object of this invention to provide an uncushioned chair far more comfortable than any hard-surface seating heretofore known.

When chairs are used in outdoor theatres and stadia, they are subject to the damaging effects of rain and other liquids falling therein. Still another object of my invention is the provision of a chair which sheds liquids readily and completely, thereby reducing the potential damage from this source of trouble.

These and other objects of the invention are accomplished by providing a stacking chair which is compact, simple in construction, light in weight, strong, durable and easily and firmly attachable to another identical chair. The frame of this inventive chair is of minimal bulk, and when these chairs are stacked, corresponding frame members are immediately adjacent each other, rather than being separated by useless empty space. The present invention makes it possible to stack forty chairs into a four-foot-high space formerly required for fewer than ten chairs of previous designs. In larger quantities the net occupation of space is two chairs per cubic foot (i.e., 320 chairs will go into 160 cubic feet). Moreover, the chair of this invention is of simple construction; so simple that no skill in handling chairs is necessary to maneuver it. My new chair is so compact and easy to handle that large quantities can be carried on dolly carts with a minimum of effort. It is possible for two men to stack or unstack and put in place approximately one hundred of my chairs a minute.

The present invention overcomes the attaching problems by providing a simple fastening means which is quick and easy to operate and which efficiently connects my chairs to one another in any number desired. A connected row of my chairs may be pushed and slid along the floor in any direction and also may be lifted and transported without danger of coming apart. No additional parts, such as long boards, screws, nuts, or bolts are required and no screw drivers, wrenches or other tools are needed to fasten my chairs together.

My chair is the result of a thorough study of seating comfort and, as such, provides a maximum of comfort for both slouched loungers and upright sitters. It is appropriately suited to auditoriums and theatres and other places where people must sit for hours at a time. While the seat is shaped for comfort, it also has been sculptured to allow water to drain, so that no puddles form when it rains, a feature making my chair especially useful in outdoor areas.

These and other highly desirable features provided by the present invention are more fully described by the drawings, in which.

A SINGLE CHAIR 50 CONSIDERED GENERALLY

Figure 1:
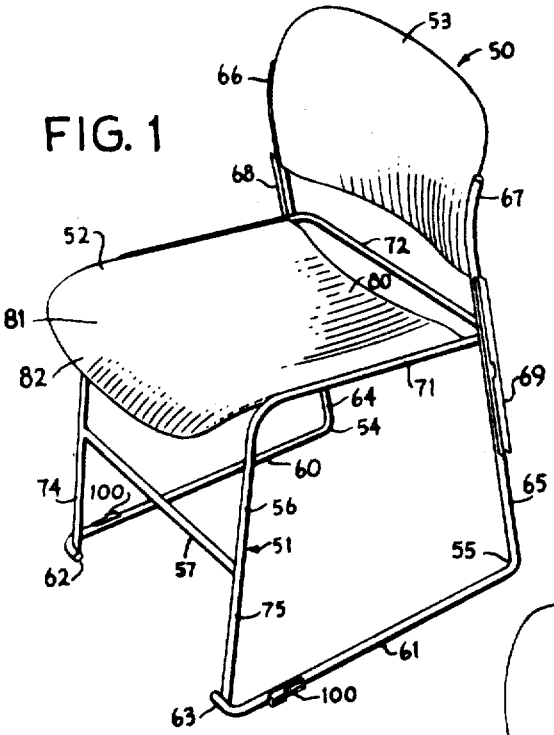
FIG. 1 is a view in perspective of a chair embodying the principles of the present invention.

A single chair 50 embodying the principles of the invention is shown in FIGS. 1 to 5. The chair 50 is not a folding chair—all its parts are rigidly secured together and are immovable relative to each other—but it is readily stackable in a small space. Broadly speaking, the main elements of the chair 50 are a frame 51, a seat 52, and a back 53; the seat 52 and back 53 being separately and rigidly secured to the frame 51.

Even before considering the chair 50 in detail, certain outstanding features can be noted:

(1) The height H (FIG. 3) of the seat 52 above the floor is many times the thickness T of the frame 51, preferably 30 to 1 or greater.

(2) The thicknesses $t_1$ of the seat 52 and $t_2$ of the back 53 are each less than the thickness T of the frame 51 (see FIGS. 3, 30 and 32), so that when several chairs 50 are stacked, the frames 51 rest one upon the other and the seat 52 and backs 53 do not touch. In other words, the chairs 50 do not rest on their seats 52 or backs 53 when they are stacked.

(3) The space below the seat 52 is entirely open; there is no brace or other obstructing member in this space that would prevent nesting.

(4) Below the seat 52 the frame 51 slopes out toward the front and toward the back.

Many other important features will become apparent from more detailed consideration; first, of the single chair 50, then of chairs 50 stacked individually, then of chairs joined in rows, and finally of chairs stacked in rows.

THE FRAME 51

The frame 51 may conveniently be made of cylindrical steel rod, and may be quite slender. For example 7/16" steel rod has been successfully used to produce a strong, lightweight, stackable chair. The cross-section may be oval, square, rectangular, or other suitable shape, instead of the cylindrical form illustrated. Moreover, although metal is preferred as the frame material, wood, reinforced plastics, glass fiber rods, and other materials of sufficient strength per cross-sectional thickness and of sufficient durability may be used for some applications.

Preferably, the frame 51 comprises four principal components welded or otherwise rigidly secured together; two side-frame members 54 and 55, a seat-frame member 56, and a front cross brace 57.

The side-frame *portions shown as* members 54 and 55 are symmetrical rather than identical, and have respective horizontal floor-engaging bottom rails 60 and 61, each with an inwardly turned front-end portion 62, 63 and an upwardly extending, forwardly sloping rear leg 64, 65. The rear legs 64, 65 extend up above the seat 52 and terminate in back-supporting portions 66, 67 which may be bent to extend backwardly, if desired.

When making the rear legs 64, 65 from slender stock, they are preferably strengthened by welding or otherwise firmly securing to them stiffening members 68, 69 to prevent their collapse upon application of severe sidewise stresses. As shown in the drawings, the members 68 and 69 extend along the rear legs 64 and 65 both above and below the juncture of the rear legs 64 and 65 with the back rail 72 and the side rails 70 and 71. As will be seen later, these stiffening members 68, 69 may be made to perform an additional novel function when the chairs 50 are joined side-by-side into rows.

Figure 6:
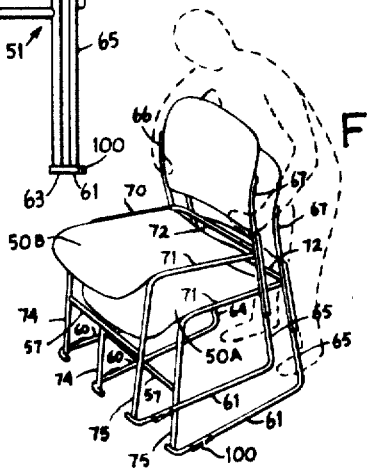
FIG. 6 is a view in perspective of two chairs like that of FIG. 1, showing one being stacked upon the other.
Figure 8:
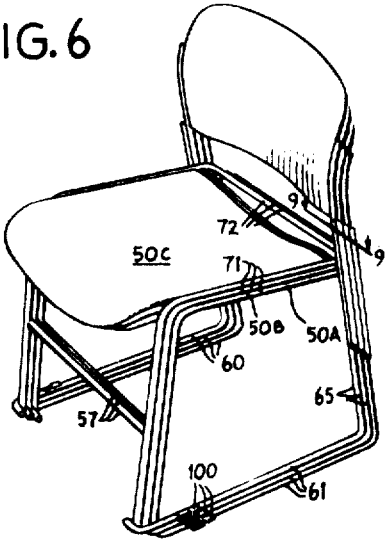
FIG. 8 is a view in perspective of a completed stack of three chairs like that of FIG. 1.
Figure 7:
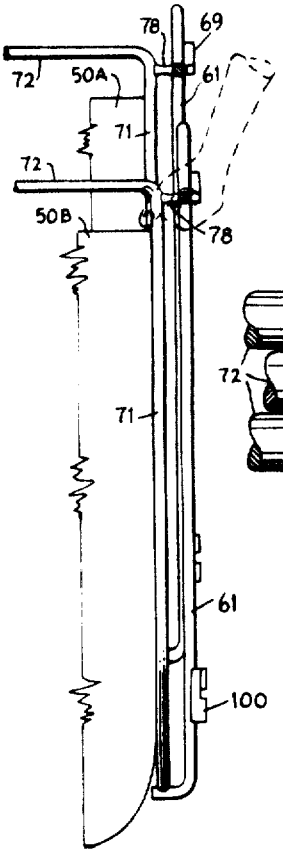
FIG. 7 is a fragmentary top plan view on an enlarged scale and partially in section of a side portion of the two chairs in their FIG. 6 position.
Figure 9:
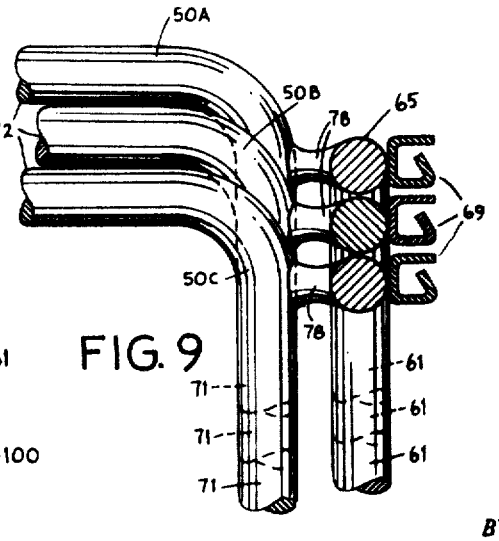
FIG. 9 is a fragmentary enlarged view in cross section taken along the line 9—9 in FIG. 8.
Figure 10:
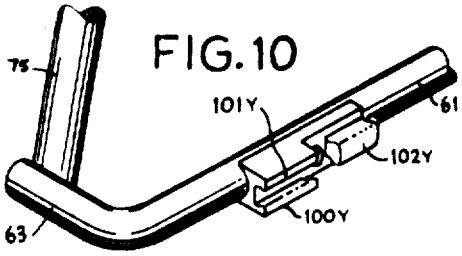
FIG. 10 is a fragmentary view in perspective of a portion of the lower left front corner of the chair of FIG. 1.
Figure 11:
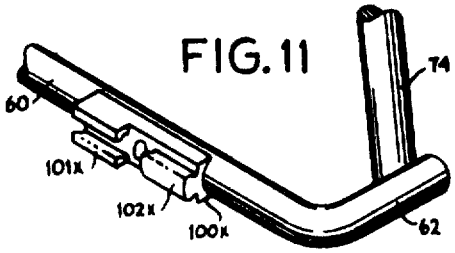
FIG. 11 is a fragmentary view in perspective of a portion of the lower right front corner of the chair of FIG. 1.
Figure 12:
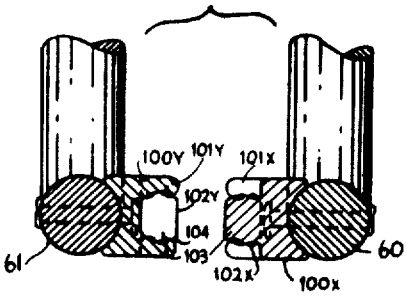
FIG. 12 is a fragmentary enlarged view in elevation and partly in section of the lower front corners of two chairs about to be joined together.
Figure 13:
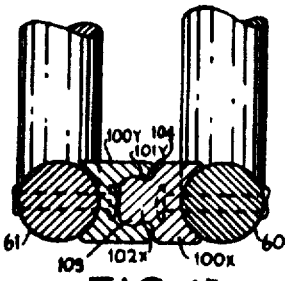
FIG. 13 is a similar view showing the chairs joined.

The seat-frame member 56 *is a frame portion that* comprises a parallel pair of upper, inclined, seat-supporting side rails 70 and 71 which are bent out from a back rail 72 and a parallel pair of front legs 74 and 75 that slope outwardly toward their lower ends 76 and 77. The side rails 70 and 71 are closer together than the bottom rails 60 and 61 by an amount at least twice the thickness of the bottom rails 60, 61; so that the bottom rails 60, 61 of an upper chair 50 are not stopped by the side rails 70, 71 of a lower chair 50, during stacking as shown in FIG. 6. For this reason, the side rails 70 and 71 are connected to the back legs 64, 65 by a spacing member, such as a metal insert or weld 78 (see FIG. 9) or by a curved-in jog 79 (see FIGS. 33 and 34).

When the frame 51 is made in the four components 54, 55, 56, and 57, it may be assembled by welding the front cross brace 57 to the front legs 74, 75 at about their mid-points and parallel to the floor, by welding the extremities of the back rail 72 to the rear legs 64, 65, using a spacing weld 78 (or a weld occurring on or closely adjacent the crests of the jogs 79), and by welding the lower ends 76 and 77 of the front legs 74 and 75 to the turned-in front ends 62 and 63 of the bottom rails 60 and 61. In place of welding, other fastening expedients, such as bolting or riveting, may be used; and the frame 51 may be made, similarly, in more than four components or fewer, but the structure described is preferred. In place of turning in the portions 62 and 63 from the frame members 54 and 55, they may be provided by turning out the lower ends 76 and 77 of the frame member 56, or a metal insert or weld may be used.

The resultant frame 51 is stackable as such; in fact, in the fully completed chair 50, the frames 51 are the elements that stack, the seats 52 and backs 53 being so made as to avoid interference with this stacking or touching during the stacking. Stacking of the frame 51 alone is often convenient in the factory.

THE SEAT 52

The seat 52 may be constructed from a wide variety of hard materials, including vinyl-clad sheet metal, sheet metal, wood, reinforced plastic, resin-impregnated glass fibers, and others; so long as the required strength and durability are achieved.

Figure 3:
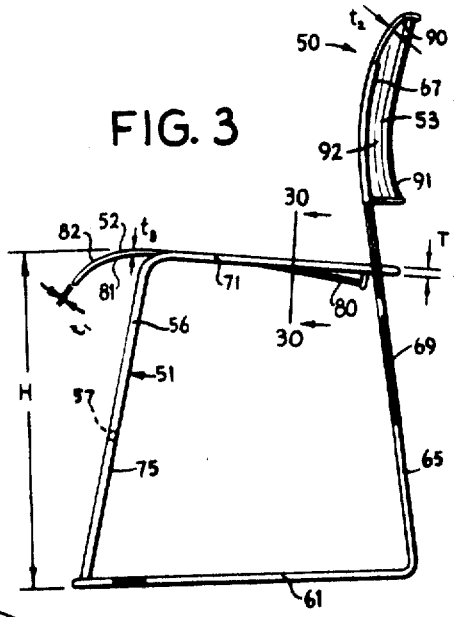
FIG. 3 is a view in side elevation of the chair of this invention.
Figure 30:
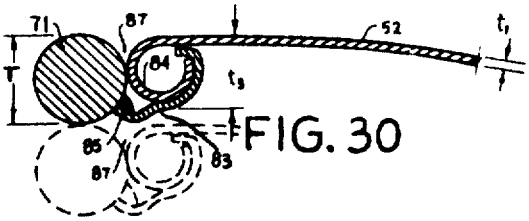
FIG. 30 is a view in section taken along the line 30—30 in FIG. 3, with the lower chair in a stack shown in broken lines.
Figure 32:
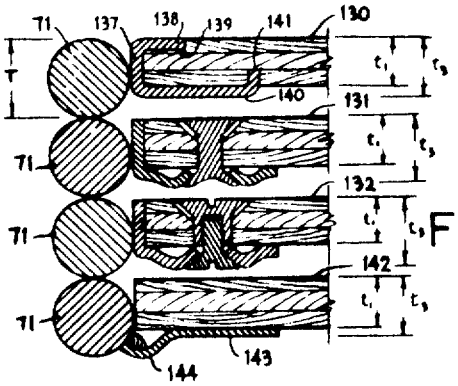
FIG. 32 is a fragmentary view similar in aspect to FIG. 30 but with four chairs stacked and those chairs having wooden seats, each seat being fastened to its frame somewhat differently.

The thickness $f_1$ of the seat 52 is substantially less than the thickness T of the frame 51, as clearly illustrated in FIGS. 3, 30, and 32. This critical feature of my invention enables the chairs to be stacked upon one another with a maximum of compactness, nor only the frames 51 of the several stacked chairs are in contact, the seats 52 not touching each other.

Because of the strong tendency for fatigue to develop when one sits in a hard chair for a moderate period of time, extensive investigation has been made in an attempt to reduce this problem to a minimum. After much experimentation, I have devised a contoured seat which is so positioned relative to the frame as to provide extreme comfort for the user over long, continuous periods. The rear quarter 80 of my seat 52 is sloped downwardly from each side rail 70, 71 to the front-to-rear midline of the seat, giving an inverted arcuate effect, and the front quarter 81 has a graceful, downwardly curving leading edge 82 to comfortably support the legs and knees of the occupant. The entire seat 52 is further sloped downwardly in a front-to-back direction (FIG. 3). This contouring also enables the rapid and automatic draining away of rain water or other liquid that may fall upon the seat, so that it will not collect or stand, preventing occupancy and possibly damaging the finish of the seat.

Figure 2:
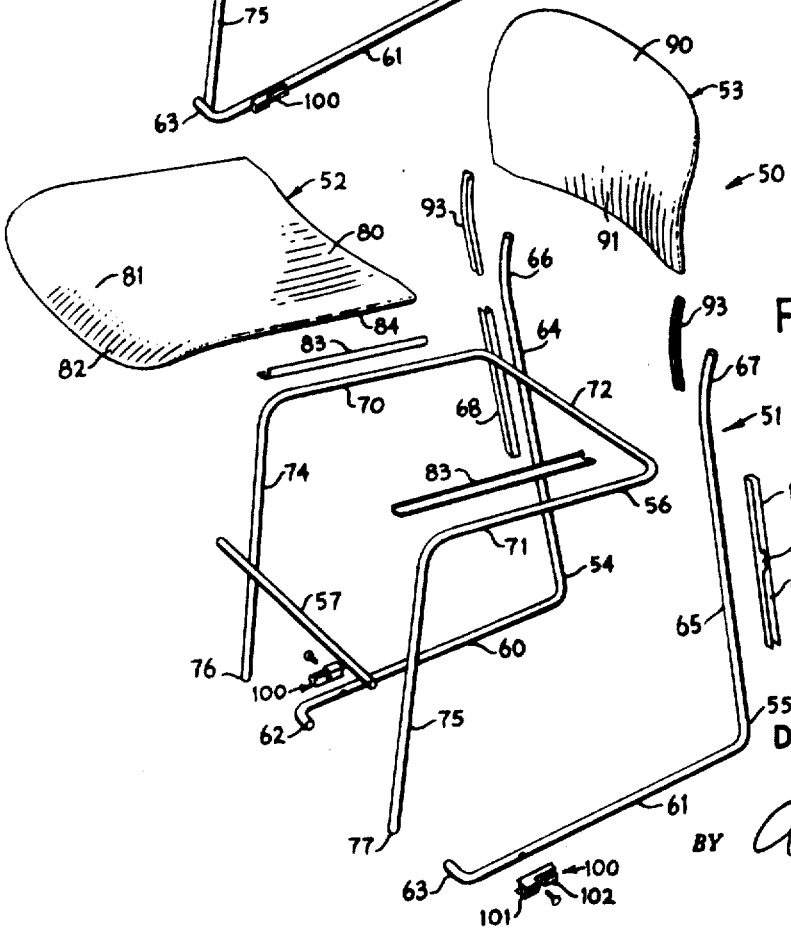
FIG. 2 is an exploded view of the chair showing the individual parts thereof.
Figure 4:
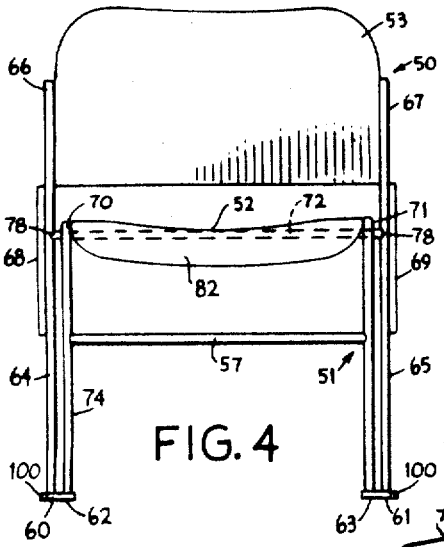
FIG. 4 is a view in front elevation of the chair.
Figure 5:
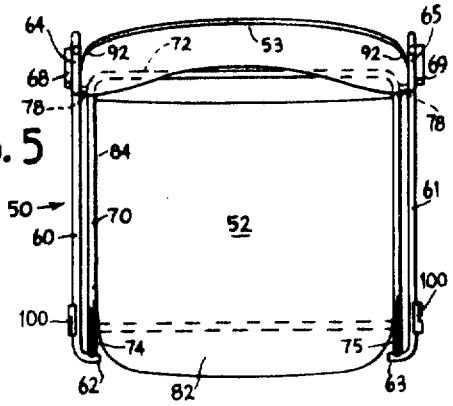
FIG. 5 is a top plan view of the whole chair.
Figure 31:
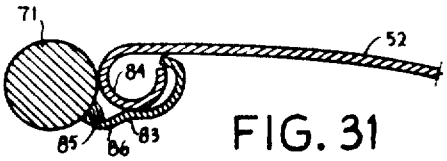
FIG. 31 is a view like FIG. 30 of the top chair alone showing the structure before crimping.

Each side of the seat 52 is firmly attached to the adjacent side rail 70, 71 by two or more brackets 83 (FIG. 2). These brackets 83 may be of the type illustrated in cross-section in FIGS. 30 and 31, which comprises a channel-like support member welded—or in some other manner firmly secured—to the adjacent side rail 70 or 71 and crimped (FIG. 30) to a rolled edge 84 of the seat 52 after insertion of that edge as in FIG. 31. When the bracket 83 is secured to the rail 70 or 71 by a weld 85, the bracket 83 may have a dip 86 to provide space for the weld 85 and to cover it. This dip 86 does not interfere with stacking, because it rests in the space 87 between the rails 70 or 71 and the rolled edges 84, as shown in FIG. 30. The illustrated brackets 83 provide a very strong and durable method of attaching the seat 52 to the frame 51, but many other types of juncture, readily apparent to one skilled in this art, are operable and may be substituted for the illustrated preferred variety. The one limiting factor to be observed in the use of other brackets is that the effective total thickness $t_3$ of the seat and bracket must be less than the thickness T of the frame member to which they are attached, so that in a stack only the frame members of the chairs will touch each other.

THE BACK 53

The chair back 53 is preferably constructed from the same material as the seat 52, but other types of hard, strong and otherwise suitable material may be used. Using the same material for both the seat and the back gives uniformity in appearance as well as in strength, and simplifies construction procedures.

As with the seat 52, the thickness $t_2$ of the back 53 must be less than the thickness T of the frame. This enables the frame members to nest snugly upon the corresponding frame members of other chairs when a stack is formed, with the backs themselves not touching each other.

The chair back 53 has been a special object of the aforementioned investigation into seating comfort, with the result that a maximum of comfort for either slouched loungers or upright sitters is obtained. As best illustrated in FIG. 3, top and bottom margins 90 and 91 of the back 53 curve backwardly in a generally arcuate manner when viewed from the side; and when viewed from the top (FIG. 5) the sides 92 curve forwardly from the center of the back. These curves result in an arch-like structure. The forward tilt of the rear legs 64, 65 gives a buttressing effect counteracting the backward pressure of the sitter on the back 53.

The back 53 is secured to the chair frame 51, and more particularly to the back supports 66, 67 as brackets 93 similar to the brackets 83, except that they are curved.

THE CHAIR 50 AS AN INDIVIDUAL CHAIR

Considered alone without regard to its stacking features, the chair 50 has many highly advantageous qualities. For instance, it is easily handled with a minimum of effort. It is made of a relatively small number of parts, enabling production for a lesser cost than other more elaborate chairs. Then, these parts are joined together in a relatively simple manner, also aiding in pairing the expense of construction. Although the chair frame is made from very slender rod material, it is extremely strong, due to the particular configuration of the frame. So too are the seat and back members extremely strong, yet consisting of relatively thin, inexpensive material. The chair achieves a peak of comfort never before attained by hard-surfaced chairs. The chair is extremely durable and can withstand much severe abuse such as is encountered in usage as auxiliary public seating, where it is quite often set up and then stored away. From these attributes it is readily apparent that my chair has lessened or entirely eliminated some of the problems in the art, and provides a means of inexpensive, durable and comfortable seating for a great number of occasions.

STACKING INDIVIDUAL CHAIRS

Figure 20:
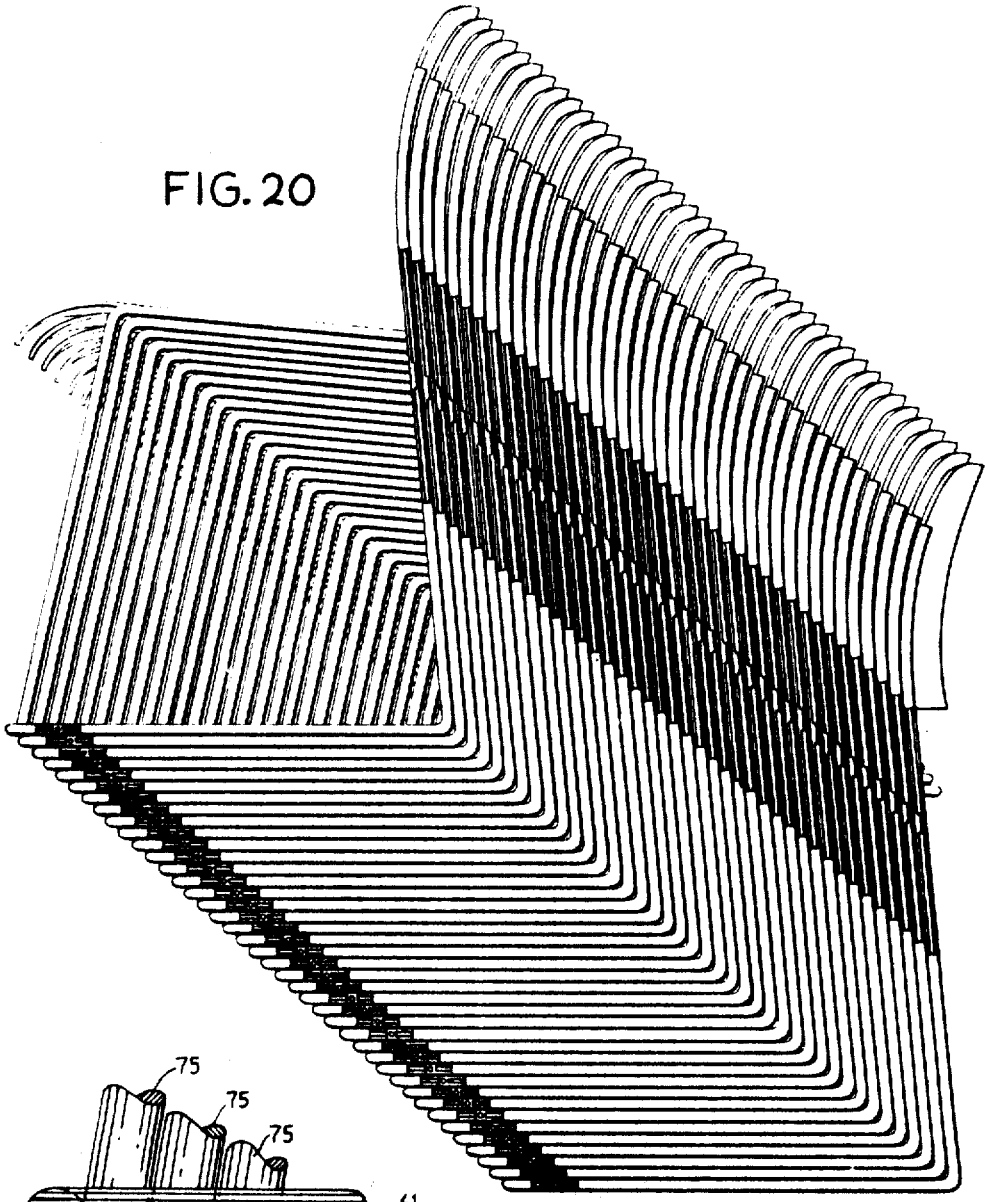
FIG. 20 is a view in side elevation of a four-foot high stack of 40 chairs differing from that of FIG. 1 only in having a plywood seat and back instead of plastic clad sheet metal.
Figure 21:
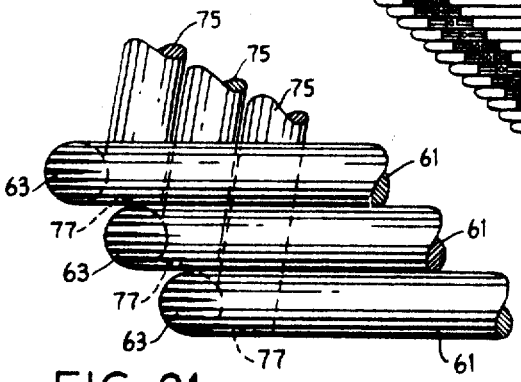
FIG. 21 is a fragmentary enlarged view in side elevation of the lower left-hand corner of three stacked chairs.

As illustrated in FIGS. 6–9, stacking individual chairs is an easy process. The potential upper chair 50B (FIG. 6) is placed above, but slightly forward of, the potential lower chair 50A, with the side rails 70 and 71 and the bottom rails 60 and 61 of the hpper chair 50B directly over the same rails, respectively, of the lower chair 50A. Therefore, as the chairs are stacked one on top of another, the rear legs 64, 65 and the bottom rails 60, 61 of the upper chair 50B straddle the side rails 70, 71 and the front legs 74, 75 respectively, of the lower chair 50A. The upper chair 50B is then lowered down and back to contact the lower chair 50A. When the upper chair 50B comes to rest on the lower chair 50A in the most compact position (FIGS. 9 and 8) the side rails 70, 71, the back rail 72, the front legs 74, 75, the bottom rails 60, 61, the rear legs 64, 65, the back supports 66, 67, and the front cross brace 57 of the upper chair 50B are resting snugly on the same members, respectively, of the lower chair 50A. A third chair 50C may similarly be added, and so on. No unused space is left between the stacked chair frames 51, with a result that the chairs occupy the very minimum of storage space. This fact shows up especially well in FIGS. 20 and 21. In quantities above ten, my chair design enables more chairs to be placed in a given volume of storage space than has ever before been achieved with either folding or stacking chairs. For instance, forty of my chairs can be put in a stack about four feet high (FIG. 20).

ROWS OF CHAIRS

Figure 15:
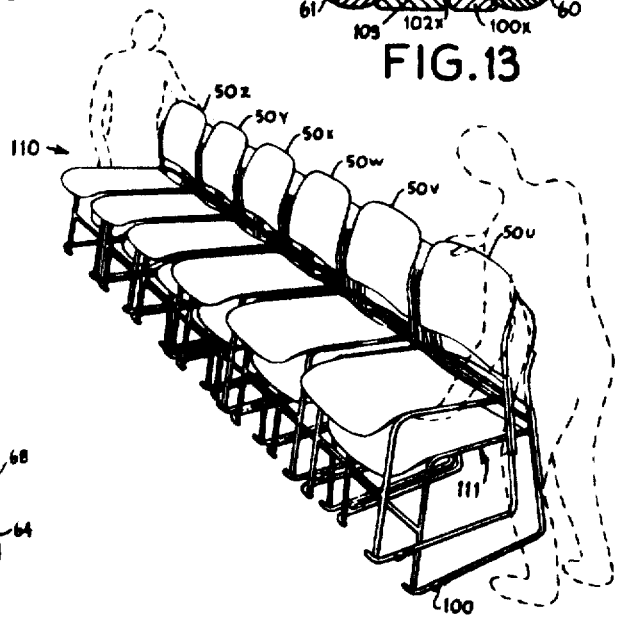
FIG. 15 is a view in perspective of two rows of chairs, each made by joining chairs like that of FIG. 1 together side-by-side, with one row of chairs being stacked upon another row of chairs.
Figure 14:
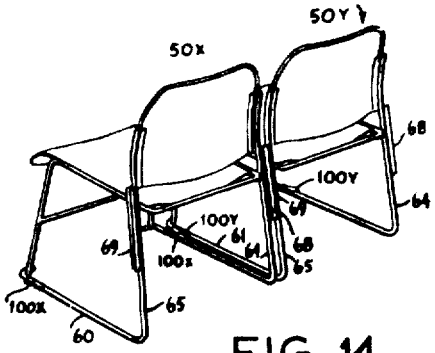
FIG. 14 is a view in perspective, looking from the rear, of two chairs like that of FIG. 1 fastened together side-by-side.
Figure 16:
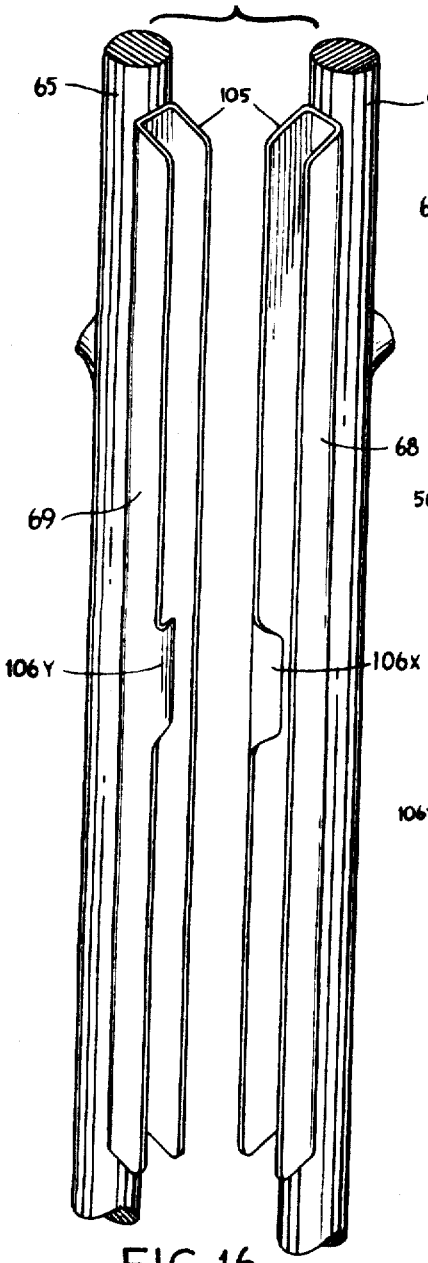
FIG. 16 is a fragmentary enlarged view in perspective of the rear legs of two adjacent chairs about to be joined together.

In order to join several chairs together in a row, as illustrated in FIGS. 14 and 15, novel means have been provided which are simple yet strong and durable in structure—and which are extremely quick and easy to operate. In a preferred form of the invention, the joining means include the brackets 68 and 69 to join the rear legs 65 and 64 of two different chairs 50x and 50y, while the front portion of the bottom rail 60 of one chair 50x is joined to the front portion of the bottom rail 61 of the other chair 50y by a pair of hermaphroditic snap-fastener members 100. As best shown in FIGS. 10–13, each member 100 has a female receptacle 101 and a male part 102 and is made from a hard elastomeric material such as injection-molded nylon. Each member 100 is bolted or riveted to its rail 60 or 61, those on the rails 60 being designated by the addition of the letter x to the reference numeral, and those on the rails 61 having the letter y added to their reference numeral, to illustrate the fact that the members 100x are reversed with respect to the members 100y. The members 100x are shown with the male part 102x forward, and the members 100y are shown with the socket 101y forward. As shown, an outer portion 103 of each male part 102 is wider than the outer portion 104 of each female part 101, to give a snap action and a locking mechanism.

The rear brackets 68 and 69 may also be identical members, such as those shown in FIGS. 16–19, one being upsidedown with respect to the other. Each bracket 68, 69 comprises a U-shaped channel 105 with a hook-like tab 106 about midway of its length. (There may be more tabs 106 and even a single tab may be located elsewhere.) The two tabs 106 have been differentiated in FIGS. 16–19 by the addition of letters x and y.

Figure 17:
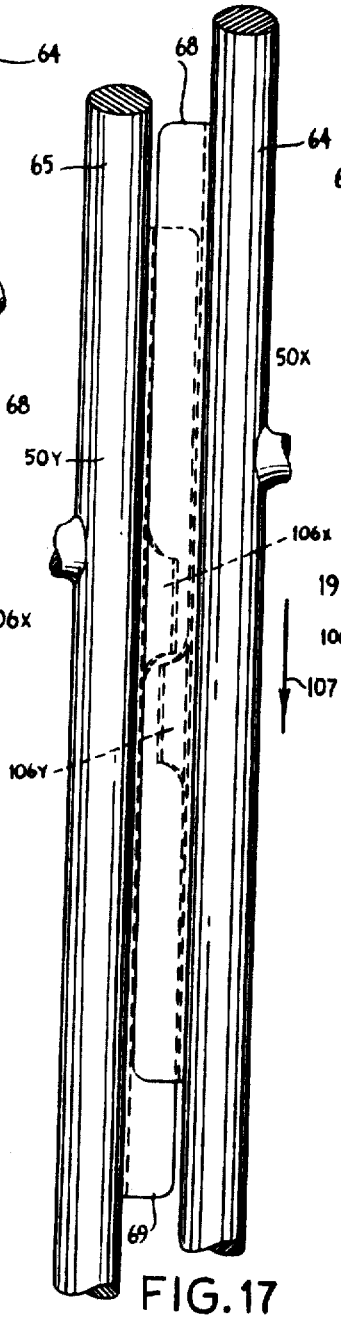
FIG. 17 is a similar view showing the elements during the joining process.
Figure 18:
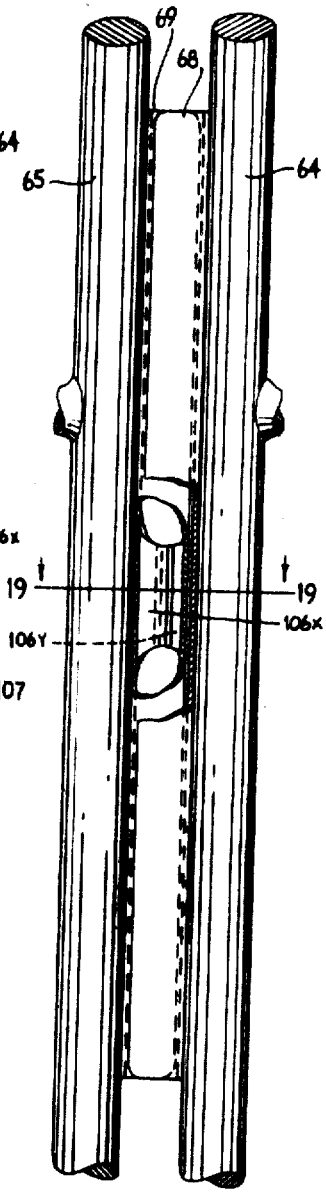
FIG. 18 is a similar view showing the elements after being joined, a portion being broken away and shown in section.
Figure 19:
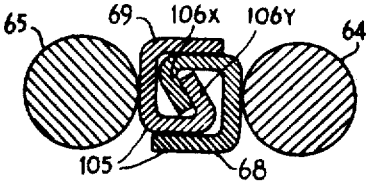
FIG. 19 is a view in section taken along the line 19—19 in FIG. 18.

To join the two chairs 50x and 50y together, the chair 50x may be lifted slightly above and beside the chair 50y and the channels 105 engaged, the tabs 106 not being engaged, as in FIG. 17. Then the chair 50x is lowered as indicated by the arrow 107 in FIG. 17, until the tabs 106x and 106y are interlocked, as shown in FIGS. 18 and 19. The two chairs 50x and 50y can, at this stage, still rotate a small amount about the interlocked channels and tabs. Then, the fasteners 100x and 100y are smartly snapped together, the male members 102x and 102y engaging the sockets 101y and 101x. The chairs 50x and 50y are then firmly joined together and may be lifted or slid as a unit.

Other chairs may be added in the same manner. For example, chair 50z may be added to the chair 50y, while chair 50w is added, to the chair 50x, and chair 50v may be joined to the chair 50w, and chair 50u to the chair 50v, as shown in FIG. 15. Rows of ten or twenty chairs are quite practical to handle. The chairs are disconnected by reversing the process, unsnapping the members 100 and lifting the bracket 68 out of the bracket 69, or lifting the bracket 69 out of the bracket 68, for in either connection or disconnection, either chair may be lifted and put into or lifted and taken out from the other chair.

STACKING ROWS OF CHAIRS

Figure 23:
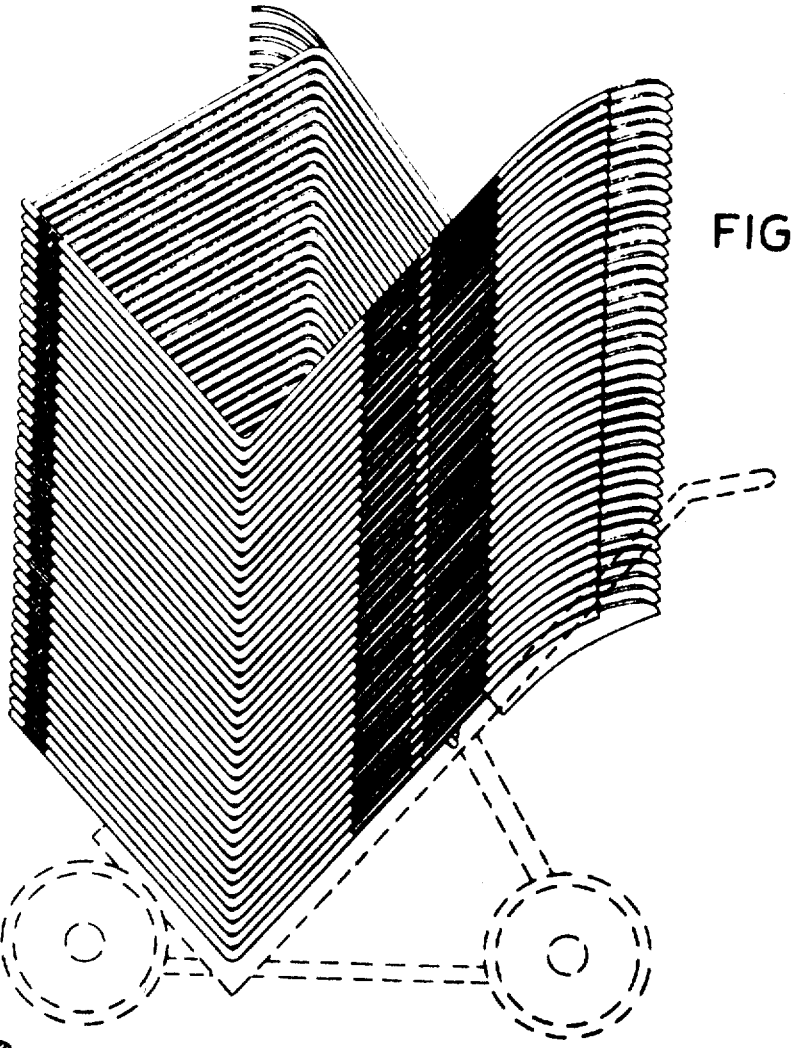
FIG. 23 is a view in side elevation of the stack of chairs of FIG. 20 held in vertical position on a dolly cart which is shown in broken lines.

In addition to the chairs of the instant invention lending themselves extremely well to being stacked or joined together in rows, these rows can then be stacked upon one another in a very compact fashion as illustrated in FIGS. 15, 20, and 23.

The procedure is practically identical with that followed in stacking individual chairs, described in the foregoing section entitled "Stacking Individual Chairs." Whereas one person may easily erect a stack of individual chairs, when stacking rows of my chairs, especially long rows, one operator at each end of the row is preferred. Then, simply by lifting a row 110 as a unit, positioning it so that each chair of the row 110 is centered laterally but slightly forward of its mate in a lower row 111, and lowering the upper row 110 down and back to the most snug rest position on the lower row 111, a compact stack of rows of my chairs is quickly and easily formed. As in the stacks of individual chairs, only the frame members of the chairs in the row stacks are in contact; the backs and the seats being closely adjacent but not abutting. FIG. 20 illustrates the fact that when forty rows of chairs 50 are stacked (or forty chairs) the total height is only 50% greater than that of an individual chair 50.

As a stack of individual chairs may be moved about, either by a dolly (FIG. 23) or other means, so too may a stack of rows of chairs be moved. The only limiting factor would be weight, and as my chairs are relatively light, a great many rows thereof may be stacked and moved as a unit. Such an operation has many obvious advantages over the old system of moving one row at a time and then not being able to stack these rows in a compact manner.

MODIFIED FORMS OF THE INVENTION

Various modifications may be made in the elements of the invention without disturbing the general principles involved.

Figure 22:
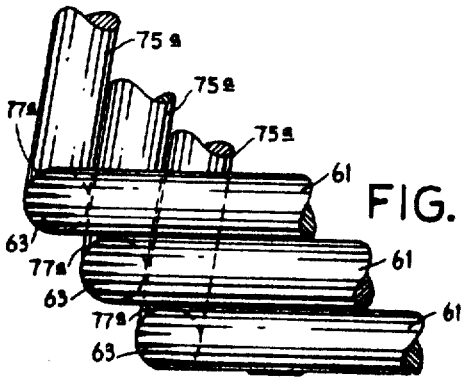
FIG. 22 is a view like FIG. 21 but showing a modified form of construction.
Figure 24:
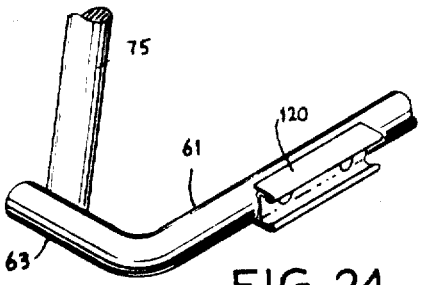
FIG. 24 is a view like FIG. 10 showing a modified form of fastening member.
Figure 25:
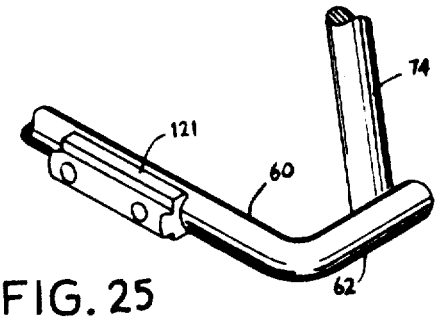
FIG. 25 is a view like FIG. 11 showing a modified form of fastening member used in conjunction with that of FIG. 24.

For example, FIG. 22 shows a very simple modification in the way that the frame 56 is joined to the side frame members 54 and 55. Here, the side frame members 54 and 55 remain the same, with their bottom rails 60 and 61 and their turned-in forward portions 62 and 63 as before, but instead of joining the bottoms 76 and 77 of the legs 74 and 75 in the manner shown in FIG. 21 (i.e., by welding the forward surface of each bottom portion 76 or 77 to the portion 63), here the actual bottom edge is resistance-welded to the portion 62 or 63. This means bringing the front legs forward somewhat or tilting them at a slightly different angle. The resistance weld 77a at the end of the legs 75a provides substantially the same effect as the expedient of FIG. 21 but in a very slightly different form.

Similarly, there may be modifications of the fastening member 100. Instead of using a hermaphroditic member 100, it is feasible to use a female member 120 on one rail 60 of the chair and a male member 121 on the other rail 61. This requires the manufacture of two different types of fastening members, but the operation is substantially the same as that already described. FIGS. 24 through 27 also show that it is possible to make the connecting members 120 and 121 from metal. The female member 120 may be made from spring steel, bent as shown best in FIG. 27. The member 121 may be a block of either metal or plastic, such as nylon of suitable strength. Again, the action is a simple snap action. It will be apparent from this how other modifications in the snap fastener may be made if desired.

Figure 29:
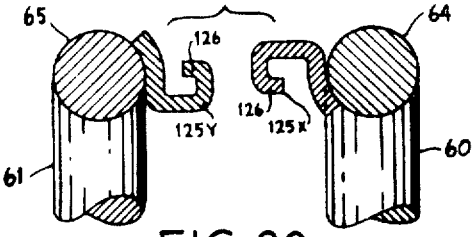
FIG. 29 is a view like FIG. 28 with the fasteners apart.
Figure 28:
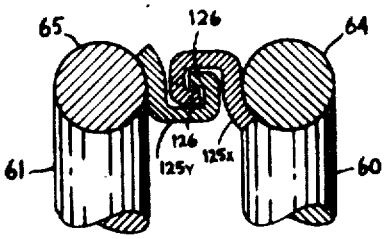
FIG. 28 is a view like FIG. 19 of a modified form of leg-fastening means.
Figure 27:
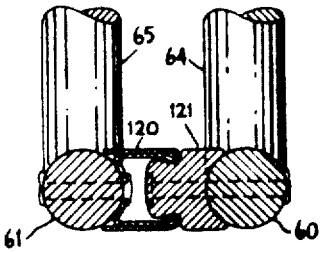
FIG. 27 is a view like FIG. 13 of the joined fastening members of FIG. 26.
Figure 26:
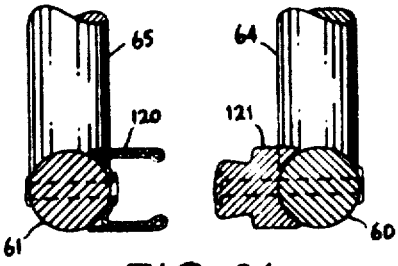
FIG. 26 is a view like FIG. 12 showing the fastening members of FIGS. 24 and 25 before they are joined together.

FIGS. 28 and 29 show a modified form of fastener 125 which may be substituted for the fasteners 68 and 69. In this instance the members 125 may comprise continuous channels with hook portions 126, or the hook portions 126 may be tabs similar to tabs 106 of the members 68 and 69. The operation would be the same except that if the hook were continuous for the full length of the channel, the chair 50a would have to be lifted a little higher. Of course, the length of the channel is indeterminate; it may be as long as is needed to give the reinforcing desired.

In FIG. 32, several modifications of the seat and seat attachment are shown. These apply equally to the back and the back attachment. In this instance the side rail 71 remains unchanged and, by way of example, a plywood, fiberglass, or other similar thicker seat material is used in seats 130, 131, and 132. The seat 130 is shown fastened by a screw 133 to a bracket 134, which in turn is welded to the rail 71. A screw-post-like nut 135 may hold the screw 133 in place, lying flush with the top of the seat 130. The same bracket 134 may be used in connection with a rivet 136 that is shown fastened in a well-known manner to the seat 131. A slightly different form of bracket 137 may also be used, as shown on the seat 132. The bracket 137 has a portion 138 that rests in a groove 139 at the edge of the top surface of the seat 132, while the bracket 137 also has a lower portion 140 with an upwardly extending terminal portion 141 that may be crimped into a wooden seat 132. While illustrating modifications of the attachment structure, the main point is also brought out, which is that in all these instances the chair seats 130, 131, and 132 not only do not touch each other but the supporting bracket members that lie above them do not touch the seats either; so they cannot scar or otherwise damage the surface of the seat. In all instances the frame members 71 are resting on top of each other and their thickness T is greater than the effective thickness $t_3$ of the seat-bracket combination.

Similarly, a seat 142 is also shown in FIG. 32, at the bottom of the stack. The seat 142 is cemented to a flat portion 143 of a strip 144 that is welded to the rail 71. Here no screws or crimping are required, and again the same relationships apply.

Figure 33:
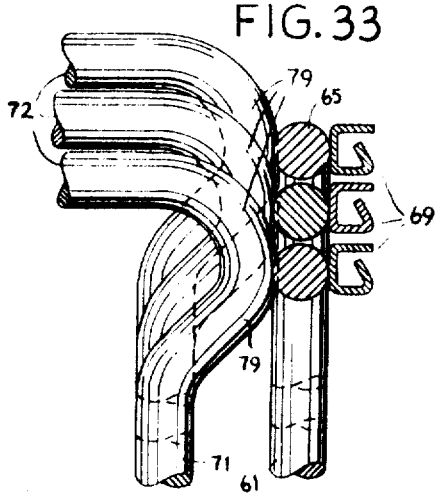
FIG. 33 is a view similar to FIG. 9 of a modified form of construction.
Figure 34:
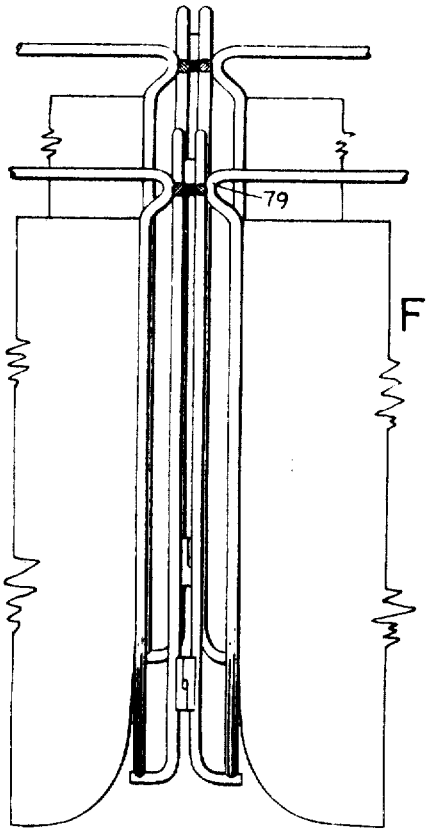
FIG. 34 is a view generally similar to FIG. 7 but showing the modified structure of FIG. 33 and showing portions of four chairs, an upper pair being stacked on a lower pair.

FIGS. 33 and 34 illustrate the stacking of rows of chairs, and also show a slight modification employing the jog 79 in the rear part of the frame, as mentioned earlier. The jog 79 simply provides another way of getting the needed lateral displacement between the rails 70, 71 and the legs 64, 65, and is comparable to the use of the metal insert or weld 78.

Figure 35:
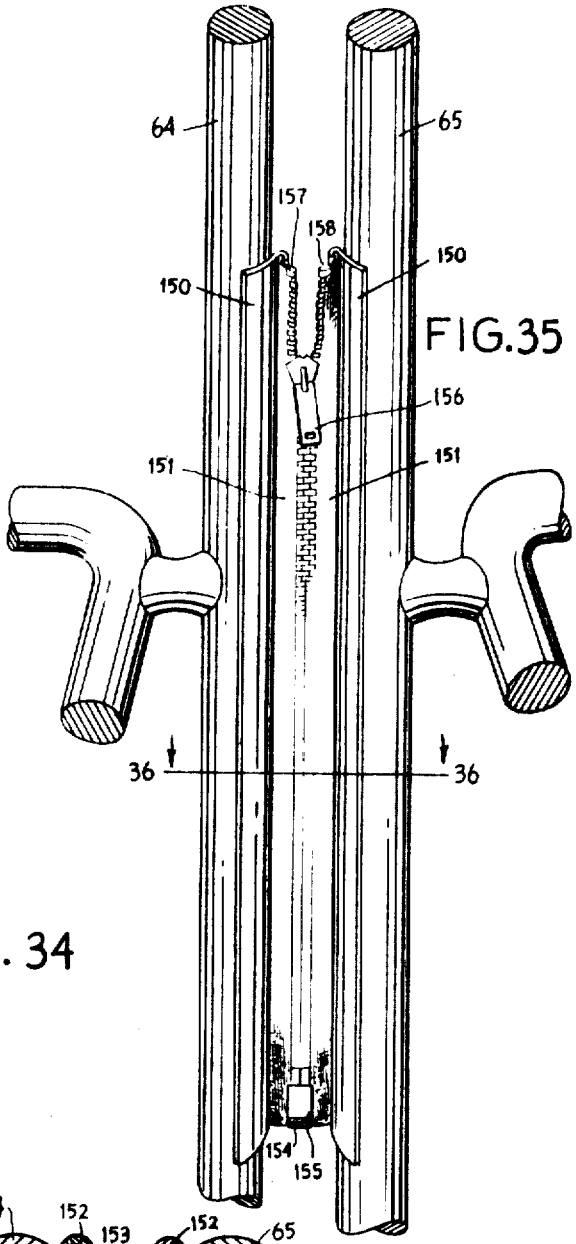
FIG. 35 is a view similar to FIG. 18, but showing a modified form of construction.
Figure 36:
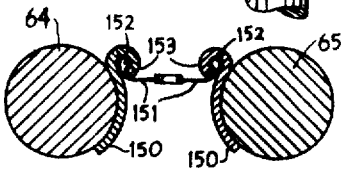
FIG. 36 is an enlarged view in section taken along the line 36—36 in FIG. 35.

Another modification that may be used in place of the joining members 68 and 69 is shown in FIGS. 35 and 36. Here is shown a zipper-type slide fastener that is completely separable at the base, such as is used in many coats. In this instance an arcuate strip 150 is secured to each leg 64 and 65, as by spot welding, and then strips of fastener tape 151 are crimped or cemented or both crimped and cemented to the strip 150. For example, the tape 151 may have a thick selvage 152 around which a portion 153 of the strip 150 is crimped. To fasten the chairs together side-by-side, slide fastener elements 154 and 155 are joined at their lower ends, and a slide 156 is then slid up to join the two portions 157 and 158 together.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A lightweight, strong, durable, compactly storable chair, comprising: a relatively thin, hard and lightweight seat and back firmly affixed to a relatively lightweight, small-diameter, non-collapsible frame comprising; [a] first and second substantially L-shaped *side* frame *portions* [member], each of which forms an upstanding back support, a rear leg and a horizontal bottom rail extending forward from the bottom of the rear leg [and terminating in] *to a front end,* a short, horizontal portion extending inwardly [at an angle of 90°] from *the front end of* said bottom rail[;], [a third] frame [member] *portions* comprising parallel front legs each connected to a *bottom rail by said short horizontal portion and to a* rear leg by spacing means connected to backwardly extending side rails which, adjacent their connection to the rear legs, *are connected to* [turn inwardly to form] one, substantially horizontal, back rail, [; a fourth frame member comprising] *and* a horizontal cross brace connected at each end to approximately the midpoint of the abutting front leg; separable snap fastener means mounted on the outside of the forward portion of said bottom rails; separable fastener means mounted vertically upon each of the rear legs, said fastener means being permanently secured to said rear legs and extending along them both above and below the junction of said [third frame member] *side rails* to said rear legs so as to stiffen said rear legs; and fastening means to secure in a permanent manner the seat and the back to their respective frame supports.

2. The chair of claim 1, wherein the ratio of the seat height to the frame thickness is at least 30 to 1.

3. The chair of claim 1, wherein the seat and the back members, with their respective frame-fastening means, are thinner than the frame members.

4. A lightweight, durable and compactly stackable chair, comprising: a frame [,] consisting of parallel front legs, parallel side rails, and a back rail [, all] joined together, [to form one continuous frame member,] a front cross brace joining the midpoints of the two front legs, a pair of parallel L-shaped [members] *side frame portions* each comprising a bottom rail, a rear leg, and a back support, the front end of each bottom rail joined to the bottom of the abutting front leg and the rear legs firmly joined to the side rails; a seat member and a back member both thinner than said frame firmly fastened to the frame; fastening means attached to the forward portion of each of the bottom rails for easily, quickly, and separably linking two said chairs together; another separable chair-fastening device permanently attached to each of the rear legs to extend along its said leg both above and below said side and back rails so as to stiffen its said rear leg; the distance between the side rails being substantially less than the distance between the bottom rails so that the chair will compactly stack upon another identical chair in such a manner that the bottom rails, the side rails, the front legs, the rear legs, the back rail, the front cross brace, and the back supports of one chair abut the respective members of the other chair, with the seats and backs of the respective chairs separated from each other.

5. The chair of claim 4 wherein the fastening means attached to the bottom rails are snap fasteners.

6. The chair of claim 5, wherein the snap fastening means are identical hermaphroditic members, that on one rail being reversed relatively to the one on the other rail.

7. The chair of claim 6, wherein the snap fastening means are of hard elastomeric material.

8. The chair of claim 5, wherein the snap fastening means comprise a female member on one rail and a male member on the other rail.

9. The chair of claim 4, wherein the fastening devices attached to the rear legs comprise identical relatively long, narrow U-shaped channels having hook-like tabs thereon, one said device being inverted relatively to the other.

10. The chair of claim 4, wherein the fastening devices attached to the rear legs comprise channels with hook means that interlock when two chairs are joined side-by-side by vertical sliding movement.

11. The chair of claim 4 wherein the fastening devices attached to said rear legs comprise separable zipper-type slide fasteners.

12. A lightweight, strong, durable, compactly storable chair, comprising: a relatively thin, hard and lightweight seat and back firmly affixed to a lightweight, small-diameter, non-collapsible frame comprising; a first and second substantially L-shaped frame member, each of which forms an upstanding back support, a rear leg and a horizontal bottom rail extending forward from the bottom of the rear leg and terminating in a short, horizontal portion extending inwardly at an angle of 90° from said bottom rail; a third frame member comprising parallel front legs each connected to a rear leg by backwardly extending side rails which, adjacent their connection to the rear legs, turn inwardly to form one, substantially horizontal, back rail, the very rear portion of said side rails jogging outwardly and then inwardly to form a U-shaped bulge the outermost portion of which is firmly attached to the abutting rear leg; a fourth frame member comprising a horizontal cross brace connected at each end to approximately the midpoint of the abutting front leg; a snap fastener mounted on the outside of the forward portion of said bottom rails, a female member on one rail and a male member on the other; a relatively long, substantially J-shaped channel fastener mounted upon each of the rear legs at approximately the level of the chair seat and extending along said rear legs both above and below said seat and said side rails, one of said fasteners opening forward, the other opening rearward; and fastening means to secure in a permanent manner the seat and the back to their respective frame supports.

13. A plurality of easily detached, compactly stackable, durable, and lightweight chairs joined together side-by-side in a row, each chair comprising a seat member and a back member both supported by a frame of a thickness greater than both the seat member and the back member, said frame comprising [a first frame member, consisting of] parallel front legs, parallel side rails, [and] a back rail, [a second frame member comprising] a horizontally disposed cross brace affixed to the midpoints of each of the front legs, [; and a third and fourth frame member, each comprising] parallel bottom rails, parallel rear legs, and parallel back supports, the rear legs [of the said third and fourth frame members] being joined to the side rails [of the first frame member], and the lower ends of the front legs being joined to the front ends of the bottom rails, the space between the side rails and between the front legs of each chair being the same and also being substantially less than the space between the bottom rails, the rear legs, and the back supports, so that when the row of chairs is stacked upon another like row, the rear legs and the bottom rails on the top row straddle the side rails and the front legs of the bottom row and enable the back supports, the rear legs, the front legs, the side rails and the bottom rails of the upper row to rest upon the respective frame members of the lower row; snap-fastening means positioned on the forward portion of each of the bottom rails for interlocking the chairs of the row one to the other; and chair-fastening and rear leg bracing means mounted on the rear legs for sliding interlocking action and extending along said rear legs a substantial distance both above and below said side rails to impart stiffness thereto.

14. A lightweight, durable and compactly stackable chair comprising a frame consisting of (1) a continuous frame member providing parallel front legs, parallel side rails, and a back rail, (2) a front cross brace joining the midpoints of the two front legs, (3) a pair of parallel L-shaped members each comprising a bottom rail, a rear leg, and a back support, the front end of each bottom rail being joined to the bottom of the abutting front leg and the rear legs being firmly joined to the side rails, and (4) a pair of back leg stiffening members secured to the outside side edge of said rear legs and extending both above and below the juncture of said rear legs with said side rails, said stiffener members having separable fastener means thereon joined together to a fastener means on a succeeding chair by vertical movement initially and then pivotal movement forwardly; a seat member and a back member both thinner than said frame and firmly fastened to said frame; and snap fastener means mounted to the outside of the forward portion of said bottom rails and adapted to join chairs together side by side by a snap action after they have been joined by the rear stiffening and fastening members so that there can be no disconnecting of the chairs resulting from vertical or sidewise movement.

15. In a lightweight, durable and compactly stackable row of chairs, each chair of said row of chairs, comprising:

frame means providing substantially parallel front legs and substantially parallel side rails connected thereto, a pair of substantially parallel L-shaped [members] *side frame portions* each comprising a bottom rail and a rear leg, interposed means connecting the front end of each said bottom rail to and spacing it from the bottom of the adjacent front leg, second interposed means connecting the rear legs to and spacing them from the side rails, a pair of coacting rear leg bracket members between each pair of chairs of said row, each bracket being rigidly secured to a said rear leg and each extending laterally out therefrom and a substantial distance both above and below the spacing connection of said rear legs with said side rails and engaging with the coacting bracket member of the adjacent chair of said row, and seat and back means as thin as said frame means and L-shaped *portions* [members] and fastened to them.

*16. A lightweight, durable and compactly stackable chair comprising a frame, consisting of parallel front legs, parallel side rails, a back rail, a front cross brace joining the midpoints of the two front legs, a pair of parallel L-shaped side frame portions each comprising a bottom rail, a rear leg, and a back support, the front end of each bottom rail being joined to the bottom of the abutting front leg and the rear legs being firmly joined to the side rails, and a pair of back leg stiffening members secured to the outside side edge of said rear legs and extending both above and below the juncture of said rear legs with said side rails, said stiffener members having separable fastener means thereon joined together to a fastener means on a succeeding chair by vertical movement initially and then pivotal movement forwardly; a seat member and a back member both thinner than said frame and firmly fastened to said frame; and snap fastener means mounted to the outside of the forward portion of said bottom rails and adapted to join chairs together side by side by a snap action after they have been joined by the rear stiffening and fastening members so that there can be no disconnection of the chairs resulting from vertical or sidewise movement.*

References Cited by the Examiner

The following references, cited by the Examiner, are of record in the patented file of this patent or the original patent.

UNITED STATES PATENTS

| | | | |
|---|---|---|---|
| 1,989,426 | 1/1935 | Pollak | 297—239 |
| 1,993,601 | 3/1935 | Goldberg | 297—239 |
| 2,640,722 | 6/1953 | Hosking | 296—28 |
| 2,657,399 | 11/1953 | Rochford | 5—8 |
| 2,681,716 | 6/1954 | Block | 24—201.3 |
| 2,789,609 | 4/1957 | Post | 150—3 |

FOREIGN PATENTS

| | | |
|---|---|---|
| 102,044 | 9/1937 | Australia. |
| 122,774 | 11/1946 | Australia. |
| 714,178 | 8/1931 | France. |
| 588,880 | 6/1947 | Great Britain. |
| 380,469 | 5/1940 | Italy. |

FRANK B. SHERRY, *Primary Examiner.*

F. K. ZUGEL, *Assistant Examiner.*